(12) United States Patent
Halberstadt et al.

(10) Patent No.: US 6,763,005 B1
(45) Date of Patent: Jul. 13, 2004

(54) SATELLITE TRAFFIC ROUTING

(75) Inventors: Serge Halberstadt, Epping (GB); Catherine Rosenberg, Danbury (GB); Julian Cable, Bishops Stortford (GB); Adrian Winckles, Cambridge (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/410,314

(22) Filed: Oct. 1, 1999

(51) Int. Cl.[7] ............................................. H04B 7/185
(52) U.S. Cl. ..................... 370/316; 370/237; 370/401; 455/445
(58) Field of Search ................................ 455/426, 466, 455/428, 427, 430, 445, 12.1, 13.1; 370/401, 389, 392, 432, 221, 217, 218, 219, 220, 237, 238, 238.1, 315, 316; 709/238, 244, 239, 105

(56) References Cited

U.S. PATENT DOCUMENTS

| | | | | |
|---|---|---|---|---|
| 5,088,032 A | * | 2/1992 | Bosack | 370/392 |
| 5,708,963 A | * | 1/1998 | Mobley et al. | 455/12.1 |
| 5,752,162 A | * | 5/1998 | Sawyer et al. | 455/13.1 |
| 5,963,557 A | * | 10/1999 | Eng | 370/432 |
| 5,983,281 A | * | 11/1999 | Ogle et al. | 370/401 |
| 6,038,594 A | * | 3/2000 | Puente et al. | 709/217 |
| 6,101,180 A | * | 8/2000 | Donahue et al. | 370/270 |
| 6,189,044 B1 | * | 2/2001 | Thomson et al. | 709/242 |
| 6,219,546 B1 | * | 4/2001 | Valentine et al. | 455/417 |
| 6,223,045 B1 | * | 4/2001 | Valentine et al. | 455/466 |
| 6,272,339 B1 | * | 8/2001 | Wiedeman | 455/426 |
| 6,393,001 B1 | * | 5/2002 | Miyata | 370/316 |
| 6,415,329 B1 | * | 7/2002 | Gelman et al. | 370/401 |
| 6,418,319 B1 | * | 7/2002 | Dent | 455/456 |
| 6,584,082 B1 | * | 6/2003 | Willis et al. | 370/316 |

* cited by examiner

*Primary Examiner*—Nay Maung
*Assistant Examiner*—John J Lee
(74) *Attorney, Agent, or Firm*—Barnes & Thornburg

(57) ABSTRACT

In a satellite communications system comprising a plurality of access units X communicating with a satellite S on an up-link U and a broadcast downlink B and a plurality of gateways E to and from a network N, wherein each gateway E receives from the satellite S transmissions communicated thereto by the access units X and intended for destinations in the network N, a method of routing transmissions including a gateway E concluding that a transmission received should follow an alternative route via one of the other gateways E, sending an alternative route message to the satellite S which forwards the message using the broadcast downlink B to a plurality of the source gateways E in the system.

8 Claims, 1 Drawing Sheet

SATELLITE TRAFFIC ROUTING

FIELD OF THE INVENTION

The invention relates to a method of routing traffic in satellite communications systems. The invention also relates to access units and gateways for such systems.

BACKGROUND ART

A communications system such as the Internet comprises a multitude of networks which are inter-connected by gateways. For instance, a local area network, which could comprise all the workstations in one company, may be connected by a gateway to a wide area network. Information is distributed around the Internet from sources, for example, hosts, to destinations, for example workstations, and vice versa, in the form of datagrams. The datagrams include data, which is information to be transmitted from sources to destinations, and destination information, that is, an address. The most common form of gateways are three layer gateways (or routers) which route datagrams, having assessed the destination information, in accordance with their knowledge of the organisation of the network to which they are connected.

Most networks have an appointed default gateway through which all traffic is routed. There may be other gateways on the network, and traffic destined for certain locations within the network may be more appropriately routed through one of these other gateways. When the default gateway receives a datagram for which it considers, by assessment of the destination information, that another one of the gateways may be more appropriate, it redirects the datagram.

When communications between networks are performed via satellite, and access units route traffic to and from a source to the satellite, redirecting a datagram may involve sending it over the satellite system's links, which consumes satellite resources and introduces a delay into the transmission of the datagram. To overcome these problems, when a gateway receives from a satellite a datagram for which it considers that an alternative gateway unit may be more appropriate, it sends an internet control message protocol (ICMP) redirect message to the source of the datagram, suggesting that the datagram be sent directly to the alternative gateway, thereby cutting out the unnecessary additional step for all future transmissions.

In a system having a satellite link between networks, there may be a large number of sources, which means that there are potentially a large number of ICMP redirect messages passing around the system at any one time, which in turn may lead to congestion. Alternatively, each access unit may operate with routing protocols, but this may introduce huge complexity and does not reduce the amount of information carried over the satellite links.

In a local area network, sending a redirect message for future reference to all sources is not considered feasible because it entails extra processsing on the part of each source.

OBJECT OF THE INVENTION

The object of the invention is to provide a method of efficiently routing transmissions in a satellite communications system which minimises the amount of control information in circulation.

SUMMARY OF THE INVENTION

According to a first aspect of the present invention there is provided a method of routing transmissions in a satellite communications system comprising a plurality of access units communicating with a satellite on an up-link and a broadcast downlink and a plurality of gateways to and from a network, each gateway receiving from the satellite transmissions communicated thereto by the access units and intended for destinations in the network, the method including a gateway concluding that a transmission received should follow an alternative route via one of the other gateways, sending an alternative route message to the satellite which forwards the message using the broadcast downlink to a plurality of access units in the system.

The invention takes advantage of the inherent broadcast capability of the satellite by disseminating the redirect message to a large number of access units in the system, thereby seeking to reduce future misdirected transmissions, and to optimise use of the satellite's resources, with the minimum amount of control traffic. A satellite system is better adapted to utilise a method that is not feasible in a local area network, that is, disseminating an ICMP redirect message to a large number of sources, because the access units in a satellite system tend to be routers rather than simple hosts, and the routers devote part of their processing power and memory to routing. In addition, the resources of a satellite system are a more costly commodity than the resources of a local network, and the cost consequences of not optimising routing in a satellite system are more significant than in not optimising routing in a local area network.

Preferably, a transmission contains destination information and the gateway concludes that the transmission could follow an alternative route from the destination information and from its knowledge of the organisation of the network.

Further preferably, the system comprises the Internet and the transmission comprises a datagram including destination information and data.

A multicast address may be used to carry the alternative route message, so that access units may identify it and possibly discard it when overloaded with traffic.

The up-link may be a common up-link for all of the access units.

According to a second aspect of the present invention there is provided a gateway in a satellite communications system comprising a plurality of access units communicating with a satellite on an up-link and a broad downlink and a plurality of gateways to and from a network, each gateway receiving from the satellite transmissions communicated thereto by the access units and intended for destinations in the network, at least one gateway having means which, in response to receiving a transmission which it concludes should follow an alternative route via one of the other gateways, sends an alternative route message to the satellite for forwarding using the broadcast downlink to a plurality of the access units in the system.

According to a third aspect of the present invention there is provided an access unit in a satellite communications system comprising a plurality of access units communicating with a satellite on an up-link and a broadcast downlink and a plurality of gateways to and from a network, each access unit sending to the satellite transmissions intended for destinations in the network, which access units have means for an alternative route message forwarded by the satellite from a gateways to all access units on the broadcast downlink and means for routing transmissions according to the alternative route message.

BEST MODE

Figure 1:
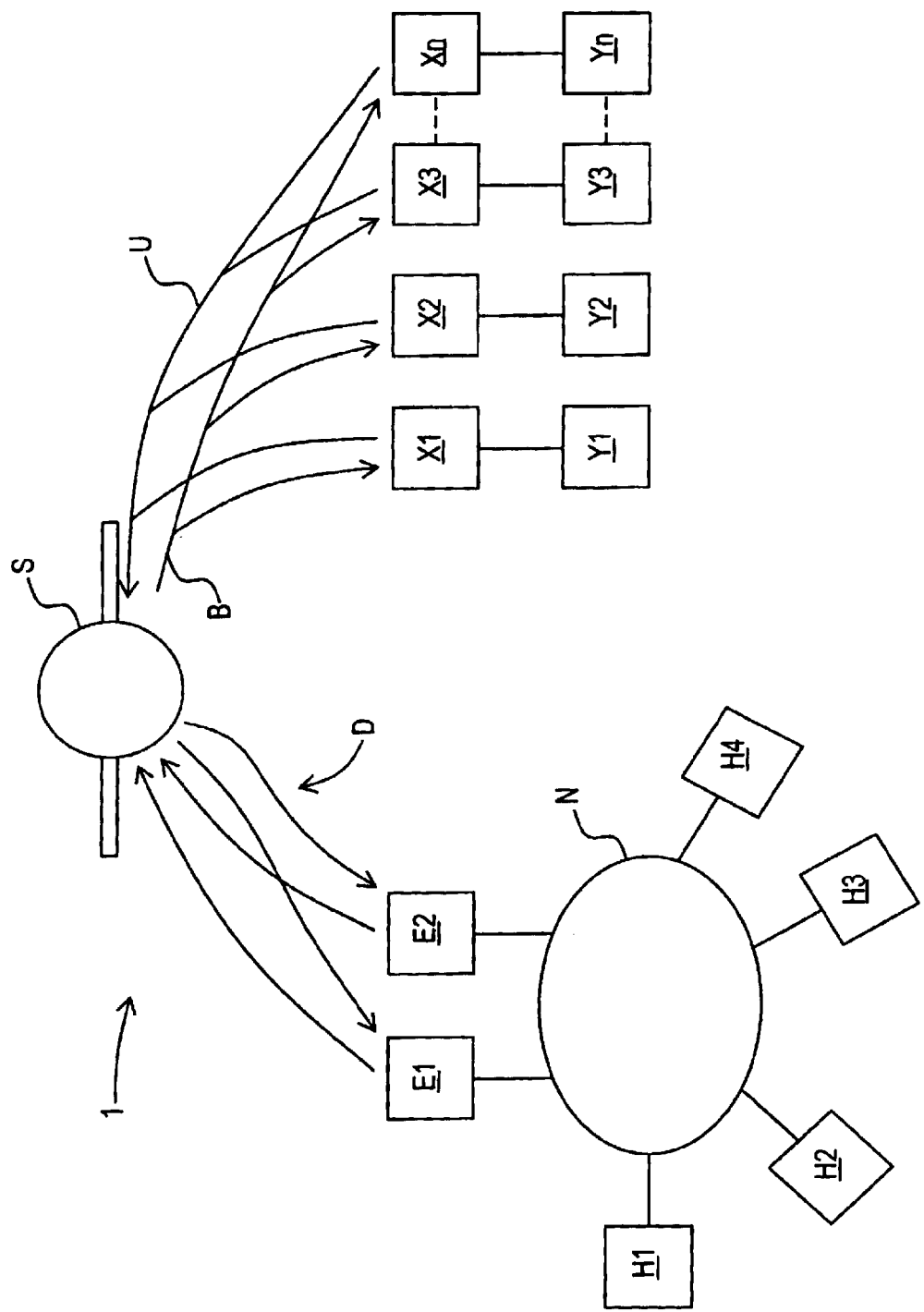
FIG. 1 is a schematic diagram of a satellite communications system operational according to the invention.

Indicated generally at 1 is a satellite communications system comprising a geostationary satellite S, a plurality of earth based access units X1-n and two earth based gateways EC-2. Each access unit X1-n provides a route for transmissions from a source Y1-n to the satellite S respectively. Transmissions are received by the satellite S from the access units X1-n on a common up-link U. The transmissions received are forwarded by the satellite S on point to point down-link D to each of the gateways E1-2 which are connected to a network N comprising four destinations H1-4. Also, there is a broadcast point to multipoint down-link B by which the satellite is able to send traffic simultaneously to all of the access units X1-n.

Each of the sources Y1-n is an internet host which sends transmissions in the form of datagrams, containing data and destination information, to the destinations H1-4. The data is the information, for example web page content, which the source Y1, for instance, has been requested to send to a destination, for example H1, identified by the unique address in the destination information. All transmissions received from the access units X1-n destined for destinations H1-4 are sent automatically by the satellite S to the default gateway E1.

When the default gateway E1 receives a datagram for which it concludes, from its assessment of the destination information in the datagram and its knowledge of the organisation of the network N, that the other gateway E2 offers a more appropriate route to its destination, the gateway E1 sends a redirect message to the satellite S. This redirect message is forwarded by the satellite S to all of the access units X1-n on its broadcast down-link B. The it message is thereby disseminated via the satellite S to all of the access units X1-n so that the current and future traffic through each access unit X1-n may be directed by the most appropriate route to its intended destination.

What is claimed is:

1. A method of routing datagram transmissions in a satellite communication system, the system comprising:

a plurality of access units, each serving a respective internet host, and communicating with a satellite on an up-link and a broadcast downlink; and a plurality of gateways to and from a network serving a plurality of destinations in the network, one of said gateways being designated as a default gateways, the method comprising:

communicating a transmission intended for a destination in the network from an internet host to the satellite via access unit;

forwarding the transmission from the satellite to the default gateway;

determining whether the transmission received from the satellite should follow an alternative route via one of the other gateways; and if it is determined that the transmission receive from the satellite should follow an alternative route via one of the other gateways, communicating an alternative route message to the satellite, wherein the satellite forwards the alternative route message using the broadcast downlink to disseminate the alternative route message to said plurality of access units.

2. The method according to claim 1 wherein the transmission contains destination information, and the default gateway determines whether the transmission should follow an alternative route based on the destination information associated with the transmission and the default gateway's knowledge of the organization of the network.

3. The method according to claim 1 wherein the system comprises the internet and the transmission comprises a datagram including destination information and data.

4. The method according to claim 1 wherein a multicast address is used to carry the alternative route message.

5. The method according to claim 1 wherein the up-link is a common up-link for the access units in the system.

6. A default gateway to and from a network for use in a satellite communications system, the system comprising:

a plurality of access units, each serving a respective internet host and communicating with a satellite on an up-link and a broadcast downlink; and a plurality of gateways to and from a network, the default gateway and the plurality of gateways serving a plurality of destinations in the network, wherein the default gateway is arranged to:

receive a datagram transmission intended for a destination in the network from the satellite, the transmission having been communicated to the satellite from an internet host via an access unit;

determine whether the a transmission received from the satellite should follow an alternative route via one of the other gateways; and if it is determined that the transmission received from the satellite should follow an alternative route via one of the other gateways, communicate an alternative route message to the satellite, wherein the a alternative route message is for dissemination from the satellite to said plurality of access units using the broadcast downlink.

7. An access unit for use in satellite communications system, the system comprising:

a plurality of further access units, the access unit and the plurality of further access units each serving a respective internet host, and communicating with a satellite on an up-link and a broadcast downlink; and a plurality of gateways to and from a network serving a plurality of destinations in the network, one of said gateways being designated as a default gateway, wherein the access unit is arranged to:

send a datagram transmission intended for a destination in the network to the satellite, the transmission having been received from an internet host and being for forwarding from the satellite to the default gateway;

receive an alternative route message from the satellite using the broadcast downlink, the alternative route message having been forwarded by the satellite from the default gateway, the alternative route message indicating that transmissions intended for a destination in the network should not follow a route via the default gateway; and route transmissions according to the alternative route message.

8. A satellite communications system comprising:

a plurality of access units, each serving a respective internet host, and communicating with a satellite on an up-link and a broadcast downlink; and a plurality of gateways to and from a network serving a plurality of destinations in the network, one of said gateways being designated as a default gateway, wherein the default gateway is arranged to:

receive a datagram transmission intended for a destination in the network from the satellite, the transmission having been communicated to the satellite from an internet host via a access unit;

determine whether the transmission received from the satellite should follow an alternative route via one of the other gateways; and if it is determined that the transmission receive from the satellite should follow an alternative route via one of the other gateways, communicate an alternative route message to the satellite, wherein the alternative route message is for dissemination from the satellite to said plurality of access units using the broadcast downlink.

\* \* \* \* \*